Fig. I.

June 19, 1962 C. M. SLACK ETAL 3,039,945
FLUIDIZED BED NUCLEAR REACTOR
Filed June 29, 1955 3 Sheets-Sheet 3

United States Patent Office 3,039,945
Patented June 19, 1962

3,039,945
FLUIDIZED BED NUCLEAR REACTOR
Charles M. Slack, Upper Montclair, N.J., and Walter G. Roman, Sidney Krasik, and William J. Purcell, Pittsburgh, Pa., assignors to Westinghouse Electric Corporation, East Pittsburgh, Pa., a corporation of Pennsylvania
Filed June 29, 1955, Ser. No. 518,716
19 Claims. (Cl. 204—193.2)

This invention relates generally to nuclear reactors employing fissionable material as fuel and, more particularly, to nuclear reactors of the type wherein the fuel is in the form of discrete pellets which are fluidized by the coolant flowing through the fuel bed.

There is disclosed in a patent application of W. G. Roman and C. M. Slack, Serial No. 382,328, filed September 25, 1953, entitled "Reactor," and assigned to the same assignee as this application, a reactor of the type using pellet fuel elements which are fluidized in a separated relation by a coolant which also acts as a moderator to achieve a fluid to fuel ratio such as to sustain a chain reaction. This invention is an improvement in the reactor disclosed in the aforesaid Roman and Slack application, which allows it to be used for a variety of applications in the reactor field. The reactor disclosed in the aforesaid copending application consists basically of a closed pressure vessel containing a bed of discrete pellets of a material capable of sustaining a nuclear chain reaction, which are separated by a coolant which also serves as the moderator, flowing through the pellets to achieve a fluid to fuel ratio such as to sustain a chain reaction. The fluid to fuel ratio is maintainend by regulating the amount of the coolant flow which also controls the power level at which the reactor is operated.

This invention utilizes the same type of reactor but improves its performance and increases its usefulness by changing the design so that it may be used for a number of other purposes, for example, as a reactor to breed new fuel material, as a materials testing reactor, and for the production of radioactive isotopes of various materials. In order that the reactor may be used for these various purposes, it has been modified in one embodiment of the invention by providing a separate tubular partition inside of the reactor pressure vessel which encloses the pellet fuel bed and provides an annular area around the pellet fuel bed. This annular area between the tubular partition and the reactor vessel may be filled with pellets of a fertile material which can be converted into new fuel material by the neutron released in the fission process and escaping from the fuel bed, or it may be filled with pellets of a material capable of reflecting neutrons back into the fuel bed and thus act as a reflector for the reactor. The reactor is also modified in another embodiment of the invention so as to provide means for introducing and removing pellets from various zones of the fuel bed. Thus, by making the fuel bed of pellets of different densities or different masses, the discrete pellets in the fuel bed may be accurately separated into various zones by the action of the coolant flowing through the fuel bed. The pellets in the part of the fuel bed which forms one particular zone may then be removed and replaced without disturbing the remainder of the fuel bed or shutting down the reactor. This feature may also be used to introduce material which it is desired to test under nuclear radiation, or which is to be converted into radioactive isotopes. The introduced material will be in the form of discrete pellets and will occupy one particular zone of the fuel bed from which they can be easily removed whenever desired.

Accordingly, one object of this invention is to provide a novel reactor having fuel elements in the form of discrete pellets with means for sorting the fuel elements into various zones and removing used fuel elements from each particular zone without disturbing the pellets in the other zones.

Another object of this invention is to provide a reactor using fuel in the form of discrete pellets with unique means for inserting and removing discrete pellets of a non-fissioning material so as to produce radioactive isotopes of the material or to test the material under nuclear radiation.

Another object of this invention is to provide a reactor using fuel elements in the form of discrete pellets with a unique reflector in the form of discrete pellets surrounding the fuel bed to reflect neutrons escaping from the fuel bed.

Another object of this invention is to provide a reactor using fuel in the form of discrete pellets with a novel form of reflector which, in addition to conserving neutrons, will act as a thermal shield in preventing undue temperature gradients in the walls of the reactor vessel due to gamma and neutron radiation.

Another object of this invention is to provide a reactor using fuel elements in the form of discrete pellets with novel means for providing regions of high neutron flux where fertile material may be converted to fissionable material.

Another object of our invention is to provide in a reactor using fuel elements in the form of discrete pellets with unique means for varying the fuel to moderator ratio so as to control the fission process to thus vary the power produced by the reactor.

These and other objects and advantages of this invention will be more easily understood from the following detailed description, taken in conjunction with the attached drawings, in which.

Figure 1:
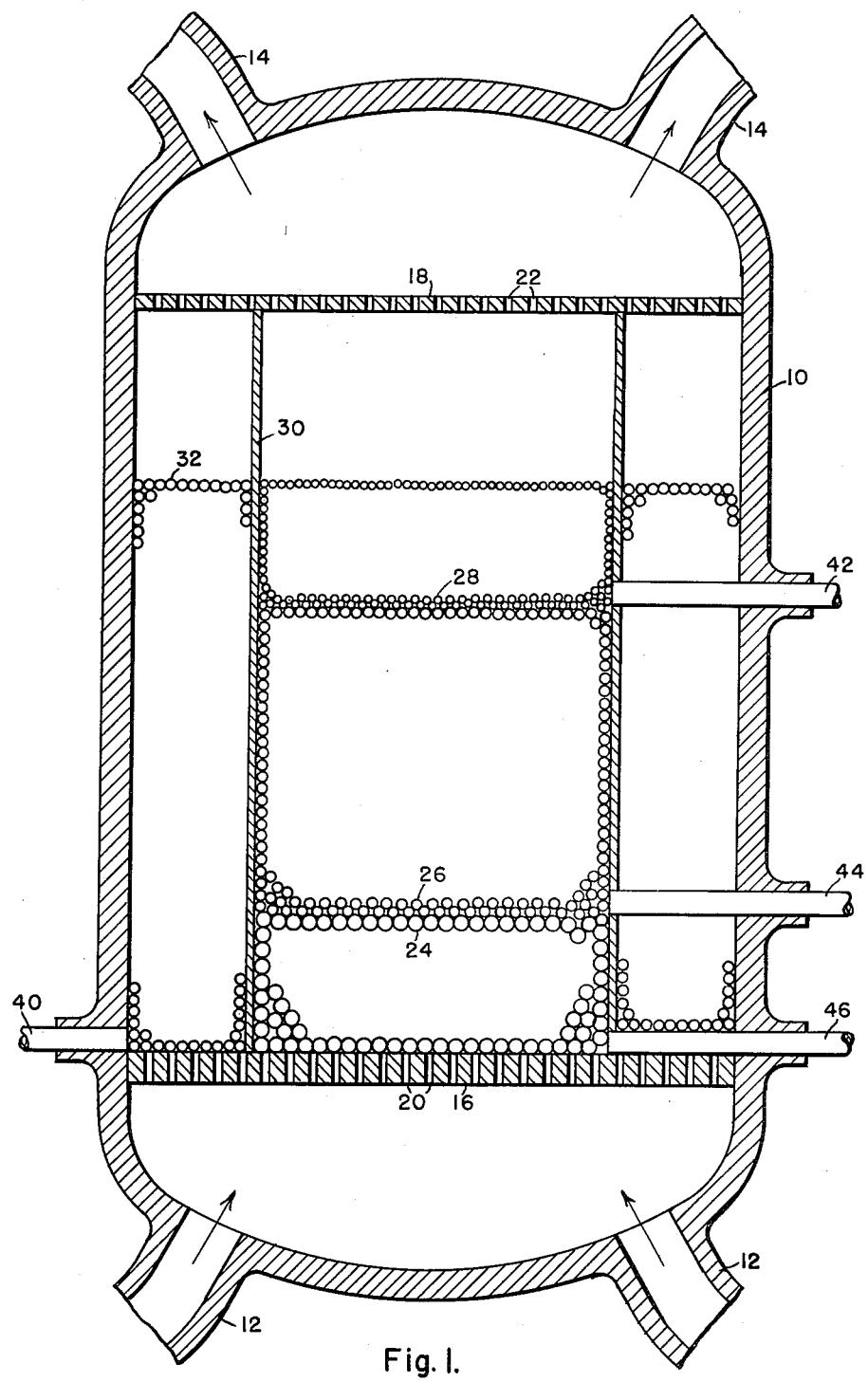
FIGURE 1 is a longitudinal section showing a reactor vessel constructed in accordance with the teachings of this invention.

FIG. 1 illustrates one simplified form of reactor vessel constructed in accordance with the teachings of this invention. In this form of a reactor vessel, there is provided a relatively thick walled pressure vessel 10 constructed of a suitable high strength material, such as steel. The interior of the pressure vessel may be clad with a corrosion resistant material such as stainless steel, if desired, although this is not essential if corrosion inhibitors are added to the coolant or a non-corrosive coolant is used. While the pressure vessel 10 is illustrated as being formed of integral construction, it will be apparent that in practice it will be formed of several sections suitably joined together, as by welding. Two inlets 12 are provided at the bottom of the pressure vessel, and two outlets 14 are provided at the top of the pressure vessel, so that a suitable coolant may be introduced at the bottom of the pressure vessel and flow upward through the fuel bed composed of discrete pellets and out the top of the pressure vessel.

A transverse partition 16 is provided adjacent the bottom of the pressure vessel and is secured to the inner walls of the pressure vessel by any desired means, such as by welding or the like. The partition 16 is provided with a series of uniformly spaced perforations 20 distributed over the entire area of partition 16, some of which open into the central area of the pressure vessel, and the remainder of which open into the annular area surrounding the central area. A second partition 18 is placed near the top of the pressure vessel and is attached to the inner walls of the pressure vessel by any desired means, such as by welding or the like. The upper partition 18 also contains a series of perforations 22 arranged in a pattern similar to that for the bottom partition 16. Placed between the bottom and upper partitions is a tubular member 30 which serves to divide the interior of the pressure vessel into two separate and distinct areas.

Preferably, the tubular member 30 is formed of a material having a low neutron absorbing cross-section, such as aluminum or zirconium. If it is desired to use the pellets 32 in the annular area solely as a reflector, the tubular member 30 may be formed of stainless steel which will increase the effectiveness of the reflector.

The central area of the pressure vessel is designed to contain the pellets of fissionable material which form the fuel bed of the reactor vessel. The outer annular area surrounding the tubular member 30 is designed to contain pellets of a material capable of reflecting neutrons or of fertile material which is to be converted into fissionable material. Three distinct pellets 24, 26 and 28 having different masses may form the fuel bed, as shown in the central area of FIG. 1. In addition, the fuel bed may be formed of only pellets 26 and pellets 24 and 28 used as reflecting blankets or breeder blankets. The outer annular area is shown filled with pellets 32 which may either be reflecting pellets in which case they would be formed of a material capable of reflecting neutrons, such as stainless steel, or pellets of fertile material capable of being converted to fissionable material, such as uranium 238 or thorium 232.

Thus, there is provided a core container 10 divided into two distinct areas so that two distinct types of pellets may be introduced into the core container and no intermixing of the pellets will occur. The pellets are supported by the bottom partition 16 and are prevented from passing upwardly out of the pressure vessel 10 by the upper partition 18. As shown in FIG. 1, all of the pellets 24, 26, 28 and 32 are in the collapsed position in which there is no coolant flow upward through the pressure vessel. When a sufficient coolant flow is established upward through the pressure vessel, the pellets will be moved upward into a separated relation with the smallest pellets 28 being separated first and the largest pellets 24 being separated last. The precise form or manner in which the pellets may be made is not essential to this invention, as it is contemplated that various shapes and forms of pellets may be employed. Spherically shaped pellets are shown in FIG. 1 although they could be of other shapes, the only requirement being that the shape used should be easily fabricated since a large number of pellets are required. Similarly, the particular amount of fissionable materials and other elements entering into the composition of the pellets 24, 26 and 28 may be varied. For example, pellets 26 may be formed of an alloy of a fissionable material with a suitable cladding to prevent corrosion, and pellets 24 and 28 may be of a reflecting material such as stainless steel. It is only necessary for production of heat in the pressure vessel 10 by nuclear fission resulting from bombardment of fissionable materials by neutrons that at least a number of the pellets 24, 26 and 28 include fissionable material, such as uranium 235, plutonium 239, or the like.

An example of one reactor constructed in accordance with this invention would have a pressure vessel 10 with an inner diameter of about 9.8 feet and a height of eight to ten feet. The central portion of the pressure vessel 10 between partitions 16 and 18 enclosed by tubular member 30 would have a diameter of about 8.9 feet, and the annular area surrounding the tubular member 30 would be 5½ inches wide. This size of reactor would produce approximately $943 \times 10^6$ B.t.u. per hour of heat or an equivalent of about 70,000 kilowatts of electrical power when loaded with 13.2 short tons of uranium enriched in the isotope U235 to 1.2%, and have a core lifetime of about 3,000 hours. The uranium fuel should be in the shape of spheres having a .25 inch outer diameter and a .025 inch thick cladding of zirconium or an alloy of zirconium. The exact construction of the individual pellets may be by any desired method; for example, the fuel could be in the form of a compound such as $UO_2$, which could be easily formed into spherical pellets. These formed pellets could then be clad with .025 of zirconium or an alloy thereof.

While the above is one example of a specific size of reactor constructed in accordance with this invention, various other sizes are possible depending on the design parameters of the particular reactor, such as enrichment, power rating and core lifetime. The above description is for a reactor using only fuel pellets 26 located in the central zone of the reactor of FIG. 1 to form the fuel bed. The remaining pellets 24, 28 and 32 may or may not be used and would be in addition to the above-described pellets and may be either of a reflecting material, such as stainless steel, or a fertile material, such as thorium 232 or uranium 238. The pellets 24 should have a greater mass than the pellets 26, and the pellets 28 should have a smaller mass than the pellets 26 so that they will occupy the lower and upper zones of the reactor of FIG. 1 when coolant flows upward through the pellet bed.

The coolant flow required to fluidize the pellets shown in FIG. 1 will be equal to the flow required to establish a pressure drop across the pellet bed equal to the weight of a unit vertical section of the bed, or in the above-described case, approximately 9.48 pounds per square inch. Of course, an additional pressure drop will be necessary to fluidize pellets 24 and 28 if used, the amount depending on the particular weight of the material used in forming these pellets. As the coolant flow is increased, the pressure drop across the pellet bed will remain the same, but the pellets will be separated to a greater degree. For the above-described reactor, a metal volume to coolant volume ratio of one to one in the expanded fuel bed would be required if water at 500° F. and 2,000 pounds per square inch was used as the coolant for the reactor to go critical.

In accordance with this invention, when the reactor is not in operation, the pellets will occupy the lower portion of the core container 10 in the form of a bed of pellets 24, 26, 28 and 32, due to the action of gravity. In this condition, the fuel pellets 24, 26 and 28 are in a non-critical condition, since the fuel to moderator ratio is too large to sustain a chain reaction and the pellets must be moved to a critical condition where the number of neutrons emitted per fission and available for causing another fission approaches unity. In order to move the fuel pellets 24, 26 and 28 to such a critical relationship, any suitable fluid which is capable of moderating fast neutrons is admitted through the inlet passages 12 of the pressure vessel under controlled pressure and flow conditions.

While the fluid admitted to the pressure vessel may be any desired fluid for the purpose of expanding the fuel pellet bed to a critical condition, in accordance with the illustrative embodiment of this invention, such a fluid should also be capable of acting as a coolant to conduct heat away from the core for use in producing power, and preferably should be capable of acting as a moderator to slow down the fast neutrons emitted during the fission process. While water is preferred for this purpose, this invention is not limited to this particular fluid, as it will be apparent that a number of other fluids could be used. For example, liquid metals, such as lithium and various alloys thereof, could be used, as well as various organic liquids or inorganic compounds, such as alkaline metal hydroxides.

It will be observed that such a fluid will be distributed by the perforations 20 in the bottom partition 16 into a number of upwardly directed streams of fluid, preferably uniformly distributed throughout the area of the bed of fuel pellets 24, 26 and 28, and reflector pellets 32. The pressure and flow of this fluid, which also acts as a coolant, can be adjusted in such a manner that the pellets are forced apart and suspended in the fluid for a predetermined distance upwardly in the core container 10 and in a predetermined geometrical pattern, where the fission process becomes critical and a chain reaction can be maintained. In addition, there will be some general movement and even touching of the pellets, in their fluidized state, which will assist in removing corrosion products from the pellets.

Figure 3:
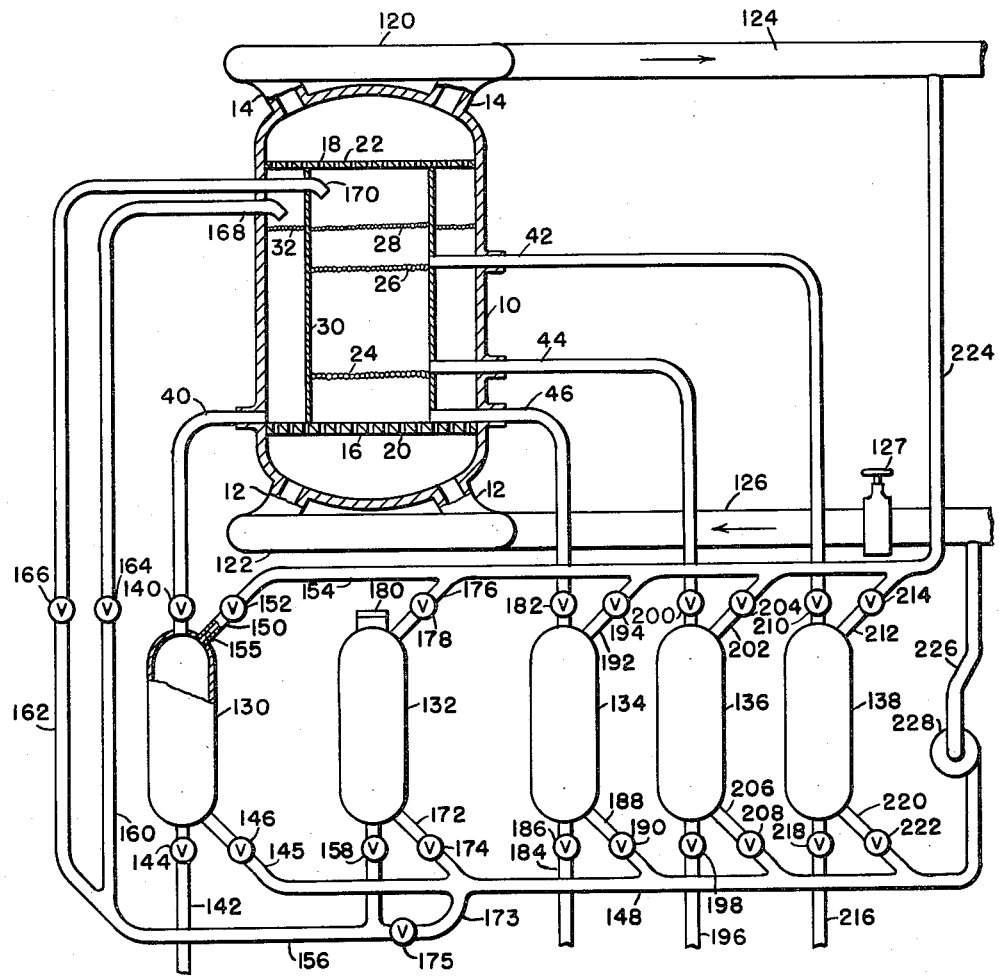
FIG. 3 shows the reactor vessel of FIG. 1 installed in a system with means for loading and unloading the discrete pellets from the various zones of the reactor and the reflector blanket, with the reactor vessel shown in longitudinal section.

The fluid then passes out of the upper outlets 14 of the pressure vessel and may be circulated in a primary coolant system from which the heat may be abstracted to perform useful work. This may be done in any suitable way, and one such system is shown in FIG. 3 of the aforesaid Roman and Slack application. It will be apparent that the heat generated in each pellet by the fission process will be rapidly conducted away by the flow of the coolant fluid, because each pellet is individually supported and surrounded by the rapidly moving fluid. Consequently, the ratio of fuel pellet surface to fuel pellet volume will be large.

As the state of criticality of the reactor is essentially determined by the balance between the neutrons absorbed by the fuel elements which produce fission, the neutrons absorbed but not producing fission, and those lost by leakage from the reactor; when a coolant, such as water, is employed which has moderating properties, the fast neutrons emitted upon fission are slowed down by the moderator so that they are more easily captured by fissionable material to produce additional fissions. The degree of criticality of the reactor can thus be controlled by varying the ratio of fuel to moderator. If the moderator is a material, such as heavy water ($D_2O$), which does not absorb neutrons to any appreciable degree, then increasing the amount of moderator would increase the number of neutrons slowed down by the moderator relative to those lost by non-fission capture or leakage, thus increasing the number available for fission. This could easily be accomplished in a reactor constructed in accordance with this invention by simply increasing the coolant flow to further expand the fuel bed and thus increase the ratio of moderator to fuel. On the other hand, if the coolant moderator is a material, such as ordinary or normal water, which has an appreciable neutron capture cross section, while control can be obtained in the same way, increased expansion of the fuel bed beyond a predetermined critical amount will result in increased neutron capture by the moderator and the criticality of the reactor will be decreased.

This type of reactor thus may have an inherent safety control should the pumping power fail, because the fuel pellets 24, 26 and 28 would then collapse into the bed shown in FIG. 1 where the ratio of moderator to fuel is low and non-critical. Similarly, the reactor may be non-critical for excess coolant flow and excess bed expansion. In most reactors considered heretofore, the ratio of moderator to fuel is fixed subject only to temperature and pressure considerations. However, such ratio may be easily varied in a reactor constructed in accordance with this invention, as indicated above.

The coolant flow through the annular area between pressure vessel 10 and the tubular member 30 will cool the pellets 32 contained in this area. When the pellets 32 are formed of a suitable reflecting material, such as stainless steel, some cooling means must be provided in order to prevent an undue temperature rise in the pellets 32 due to gamma radiation from the fuel bed. In addition, the coolant flow through this annular area will create an effective thermal barrier for preventing damage to the pressure vessel 10 by the gamma radiation from the fuel bed. The mass of the pellets 32 can be controlled so that they are fluidized by the upward flow of the coolant as shown in FIG. 1 or so that they remain in a fixed bed. If the pellets 32 are to remain in a fixed bed, the annular area between the pressure vessel 10 and tubular member 30 should be completely filled with pellets to insure that the pellets remain in a fixed bed. If the reactor is to be operated with the pellets 32 in a fluidized state, sufficient pellets 32 should be used so that the top of the fluidized pellet bed in the annular area is at the same or a higher level than the pellet bed in the central portion of the reactor.

As the coolant flows upward through the fuel bed occupying the central area of pressure vessel 10, the pellets 24 having a greater mass than any of the other pellets will occupy the lower zone of the fuel bed and will be fluidized last, with the pellets 26 which have an intermediate mass occupying the central zone of the fuel bed and being fluidized secondly, and the pellets 28 which have the least mass occupying the upper zone of the fuel bed and being fluidized first. The fluidized pellets will maintain this separated relationship regardless of the amount of coolant flow, and thus the pellets in any particular zone may be withdrawn without disturbing the pellets in the remaining two zones. Three conduits 42, 44 and 46 which pass through the side of the pressure vessel 10 and the tubular member 30 connect with the upper, central and lower zones, respectively, so that the pellets of any particular zone may be removed or replaced as will be described later. Another conduit 40 passes through the side of the pressure vessel 10 and connects with the annular area which surrounds the fuel bed so that the pellets 32 contained in this area may be removed or replaced as desired. Instead of the pellets 24, 26 and 28 being different in size, they could have different densities and be the same size and they would still separate into particular zones as described above, with the pellets having the greatest density occupying the lower zone and the pellets having the least density occupying the upper zone.

By the use of pellets having different masses, the pellets forming the fuel bed will be separated into distinct zones by the upward flow of coolant and means are provided for the removal and replacement of pellets from these distinct zones without disturbing the pellets in the remaining zones. This makes possible the sampling or the removal of spent fuel pellets of one mass without shutting down the reactor and without removing fuel pellets of different masses which are still usable. This same feature can be used for testing various materials in the reactor or for the manufacture of radioactive isotopes. All that is necessary is that the material tested be in the form of discrete pellets and have a mass either greater or smaller than the fuel pellets so that the material will be separated into a particular zone from which it can be removed and not mingle with the fuel pellets. Thus, the material can be introduced into the reactor and removed from a particular zone without disturbing the fuel pellets in the remaining zones. Of course, the material to be tested could also have a density which is either greater or smaller than the fuel pellets and it would also separate into a particular zone if the pellets were the same size as the fuel pellets. The production of radioactive isotopes could be accomplished in the same manner as the testing of various materials, the only requirement being that the material which is to be converted to a radioactive isotope must have a mass which is different from the mass of the fuel pellets so that when it is injected into the pressure vessel 10 it will be fluidized in a particular zone by the upward flow of the coolant from which it can be removed.

Figure 2:
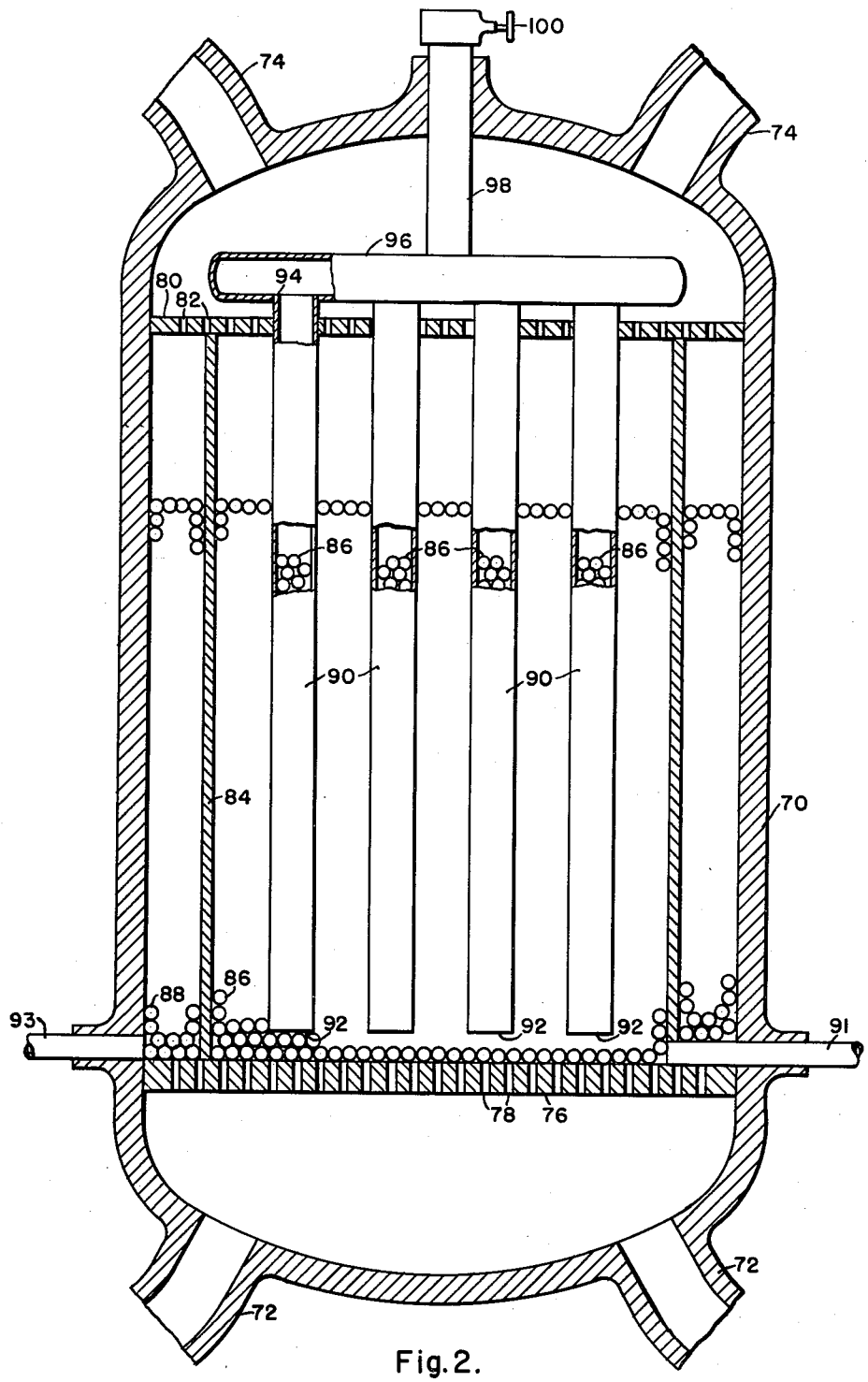
FIG. 2 is a longitudinal section showing a second form of reactor vessel constructed in accordance with the teachings of this invention.

FIG. 2 illustrates a second embodiment of this invention in which provision is made for a finer control of the coolant flow, thereby achieving more accurate control over the fluid to fuel ratio. The fine control of the coolant flow is achieved by having a plurality of open ended tubes 90 which extend downward through the fuel bed and terminate near the bottom support member 76. The upper end of each of these tubular members is connected to a common manifold 96 which, in turn, is connected to a conduit 98 passing out the top of the pressure vessel. A fine control valve 100 is installed in the line 98 that passes out the top of the pressure vessel thus controlling the rate of the coolant flow in the plurality of tubes which extend through the fuel bed. By controlling the coolant flow in these tubes, the fuel pellets contained in the tubes can either be highly fluidized or fluidized very little thus, in effect, varying the fluid to fuel ratio of the complete fuel bed. When the pellet bed is fluidized part of the pellets will move upward into the tubes 90 thus filling the tubes.

A pressure vessel 70, similar to the pressure vessel 10 of FIG. 1, has two inlets 72 at the bottom and two outlets 74 at the top. The pressure vessel 70 can be constructed in a manner similar to the manner described for the pressure vessel 10 of FIG. 1. Mounted within the pressure vessel 70 is a lower partition 76 and an upper partition 80 which are similar to the lower partition 16 and the upper partition 18 of FIG. 1. The lower and upper partitions have a plurality of passageways 78 and 82, respectively, which allow the coolant to flow upward through the fuel bed and out the top of the pressure vessel. The fuel bed is contained within a cylindrical member 84 which is mounted between the lower and upper partitions, and is similar to the cylindrical member 30 of FIG. 1. Fuel pellets 86 are placed on the inside of the cylindrical member 84 and pellets 88 of a different material are placed in the annular area between the cylindrical member 84 and the pressure vessel 70. The pellets 86 are similar to the fuel pellets 24 of FIG. 1 and the pellets 88 may be either of a reflecting material or of a fertile material which can be converted to fissionable material.

The tubular members 90 are equally spaced over the entire area of the fuel bed and pass through the upper partition 80, extend downward through the fuel bed and terminate in an open end 92 near the bottom partition 76. The tubular members 90 may be secured to the partition 80 by any desired means, such as welding or the like. The valve 100 allows the control of the coolant flow through the tubular members 90 to be varied from zero to a maximum flow of the coolant, thus varying the degree to which the pellets 86 contained in the tubular members 90 are fluidized. A conduit 91 which passes through the pressure vessel 70 and tubular member 84 connects with the fuel bed so that the fuel pellets 86 may be removed or replaced as will be described later. A second conduit 93 which also passes through the pressure vessel 70 connects with the annular area surrounding the cylindrical member 84 and is used for removing or replacing the pellets 88 which occupy the annular space.

The operation of the reactor shown in FIG. 2 is similar to the operation described for the reactor shown in FIG. 1. During initial operation, the main coolant flow and the coolant flow in the tubular members 90 can be adjusted so that the pellets fill the tubular members to the same height as the pellet bed in the central portion of the pressure vessel 70. The main difference between the reactor of FIG. 2 and the reactor of FIG. 1 is the provision for the fine control of the coolant flow by means of the tubular members 90 and valve 100. By providing for the fine control of the coolant in the tubular members 90, it is possible to vary the average fluid to fuel ratio of the entire fuel bed in smaller steps than is possible with the system illustrated in FIG. 1. By varying the main coolant flow to the inlets 72, major changes in the fluid to fuel ratio can be provided. It is necessary in some cases to provide some means for fine variations in the coolant flow to achieve a close control of the fluid to fuel ratio. This means is provided in FIG. 2 by the tubular members 90 and the valve 100.

FIG. 3 illustrates the reactor shown in FIG. 1 installed in a complete system so that the pellets from the various zones of the fuel bed may be removed or replaced, and, in addition, the pellets of the annular area which surrounds the cylindrical member 30 may be removed or replaced. Provision is also made for storing the pellets at a location removed from the pressure vessel until any heat due to the decay of fission products is removed, after which the pellets may be removed to any desired location. The main coolant flow from the outlet of suitable pumps (not shown) is conducted through the conduit 126 to a manifold 122 which distributes the coolant flow to the inlets 12 of the pressure vessel 10. A valve 127 is provided in conduit 126 to control the coolant flow through the pressure vessel 10. The coolant then flows upward through the fuel bed and the annular area which surrounds the fuel bed and out the top of the fuel vessel through outlets 14. The outlets 14 connect with the manifold 120 which, in turn, is connected with the conduit 124 which conducts the heated coolant to other equipment where the heat can be absorbed to perform useful work. One means for converting the heat contained in the coolant to useful work would be to pass it through a heat exchanger where it would convert water to steam which, in turn, could be used for propelling steam driven machinery. The method by which the heat of the coolant is used to perform useful work is not a part of this invention and may take various forms, one of which is shown in FIG. 3 of the Roman and Slack copending application.

A series of storage vessels 130, 132, 134, 136 and 138 are provided for storing the pellets removed from the reactor vessel, and also for storing new pellets which are to be injected into the reactor vessel. The vessel 130 is connected at the top to the conduit 40 which leads to the annular area surrounding the fuel bed. A valve 140 is installed in the conduit 40 so that the flow through the conduit 40 can be accurately controlled. A second conduit 142 is connected to the bottom of the vessel 130 so that the pellets removed from the annular area can be transported to other locations after they have lost the heat due to the decay of the fission products, and their radioactivity reduced. A valve 144 is placed in line 142 so that the flow out the bottom of the vessel 130 may be accurately controlled. Another conduit 145 connects with the bottom of the vessel 130 at one end and with a common header 148 at the other end. The common header 148 is used to supply high pressure coolant to each of the storage vessels in order that the pellets in the storage vessels may be hydraulically transported into the various areas of reactor pressure vessel 10. A valve 146 is installed in the line 145 so that the coolant flow may be accurately controlled. Another conduit 150 is connected to the top of the vessel 130 so that the coolant flow can be returned to the main coolant system through the second distribution header 154 which connects with line 124 by means of line 224. A screen 155 is installed in conduit 150 between the valve 152 and the storage vessel 130 to prevent pellets stored in the vessel 130 from carrying over into the coolant system. A valve 152 is installed in the line 150 to control the return of the coolant to the main coolant system. A pump 228 whose suction side is connected to the incoming cooling conduit 126 by means of a line 226 and whose discharge side is connected to the common header 148 is used to supply high pressure coolant to the common header.

In order to transport pellets 32 from the annular area of the pressure vessel 10 to the vessel 130 while the reactor is operating and coolant is flowing through the pressure vessel 10, it is necessary first to establish a coolant flow through the storage vessel 130 so that it is heated to substantially the same temperature as reactor vessel 10. In order to accomplish this, valves 146 and 152 are opened and the pump 228 started, thus coolant will be taken from the inlet conduit 126 by the pump 228 and forced to flow through the vessel 130 and back to the outlet conduit 124. When the vessel 130 has reached the temperature of the reactor vessel, the coolant flow through the vessel can be stopped by closing the valve 146. The valve 140 is opened and the valve 152 is left open so that the coolant flow is directed downward through the conduit 40 into the storage vessel 130. It is necessary to have a downward flow through the conduit 40 so that the pellets 32 are transported down the conduit 40 into the storage vessel 130 from the pressure vessel 10. The coolant is returned to the coolant system through the open valve 152 and conduits 154 and 224. The screen 155 prevents the pellets 32 from being carried into the coolant system. After the pellets 32 have been removed to the vessel 130, the valve 140 is closed and the valve 146 is again opened so that the coolant flow will be directed through the vessel 130 and back to the outlet conduit 124. The coolant flow through the vessel 130 is maintained until some of the heat contained in the pellets 32 due to the decay of the fission products is removed after which it is stopped by closing the valves 146 and 152 and stopping the pump 128. The pellets in the vessel 130 may then be removed by opening the valve 144 and allowing them to flow by gravity through the conduit 142 to another location.

A conduit 156 is connected with the bottom of the vessel 132 by a conduit having a valve 158 for controlling the flow therein. The vessel 132 has a removal top cap 180 so that pellets which are to be injected into the pressure vessel 10 may be loaded into the vessel 132. The conduit 156 branches into two separate conduits 160 and 162 which pass through the pressure vessel 10, with conduit 162 in addition passing through the tubular member 30. Conduits 160 and 162 terminate in open ends 168 and 170 in the annular area and the fuel bed, respectively. Two valves 164 and 166 are installed in the conduits 160 and 162, respectively, for accurately controlling the flow therein. A second conduit 172 connects the bottom of the vessel 132 with the common header 148 and has a valve 174 for controlling the flow therein. A branch line 173 connects the header 148 with the conduit 156 and also has a valve 175 for controlling the flow therein. A conduit 176 having a valve 178 therein is connected to the top of the vessel 132 and connects the vessel 132 with the outlet header 154 to return the coolant flowing in the vessel 132 to the main coolant system. In order to inject pellets placed in the vessel 132 into the pressure vessel 10 of the reactor, it is necessary to establish coolant flow through the vessel 132 in order to heat the vessel 132 to the temperature of the coolant by opening valves 174 and 178 and starting the pump 228. The coolant flow through the vessel 132 is maintained at a level below the free-fall velocity of the pellets in the vessel 132 so that the pellets will tend to fall towards the bottom of the vessel into the conduit 156. The valve 158 is then opened allowing the pellets to fall into the conduit 156. The valve 175 is then opened and the high pressure flow of the coolant flowing into the conduit 156 will be sufficient to move the pellets through the conduit 156 and into the branch lines 160 and 162, as desired. If the pellets are to be injected into the annular area of the pressure vessel, the valve 164 of the conduit 160 would be opened, and the pellets moved by the high velocity coolant flow would move upward through the conduit 160 and be injected into the annular area through the open end 168 of the conduit 160. After all of the pellets contained in the vessel 132 have been injected into the annular area, the valves 158, 164 and 175 may be closed, thus stopping the high velocity flow of the coolant through the conduits 156 and 160. Then the valves 174 and 178 are closed to stop the flow of the coolant through the vessel 132. The vessel 132 is then ready for receiving another charge of pellets to be injected into the pressure vessel 10 of the reactor by removing the removable top cap 180 and loading the pellets to be injected.

The remaining storage vessels 134, 136 and 138 are connected with the lower, the central and the upper zones of the fuel bed, respectively, in a manner similar to that used in connecting the storage vessel 130 with the annular area of the pressure vessel 10. The conduit 46 of the pressure vessel 10 is connected to the top of the storage vessel 134 and has a valve 182 installed for controlling the flow therein. The coolant flow from the common header 148 is supplied to the bottom of the storage vessel 134 by conduit 188 which has a valve 190 for controlling the flow therein, and is returned to the coolant system by a conduit 192 at the top of the vessel 134, which has a valve 194 for controlling the flow therein. A conduit 184 is installed in the bottom of the storage vessel 134 so that the pellets removed from the lower zone of the fuel bed may be removed to another location when desired. A valve 186 is installed in the conduit 184 for controlling the flow of pellets in the conduit 184.

The conduit 44 of the pressure vessel 10 is connected to the top of the storage vessel 136 and has a valve 200 installed for controlling the flow therein. The coolant flow from the common header 148 is directed to the bottom of the vessel 136 by means of the conduit 206, which has a valve 208 for controlling the flow, and is returned to the main coolant system by a conduit 202 connected to the top of the vessel 136, which has a valve 204 for controlling the flow therein. Vessel 136 is also provided with a conduit 196 for transporting the pellets removed from the central zone of the fuel bed to another location, and has a valve 198 for controlling the flow of pellets therein.

The conduit 42 of the pressure vessel 10 is connected to the top of the storage vessel 138 and has a valve 210 for controlling the flow therein. The storage vessel 138 is connected to the common header 148 by a conduit 220 which has a valve 222 for controlling the flow therein. The coolant flow in the storage vessel 138 is returned to the main coolant system by a conduit 212 at the top of the vessel which has a valve 214 for controlling the flow therein. A conduit 216 is provided at the bottom of the storage vessel 138 for the removal of pellets from the vessel 138 and has a valve 218 for controlling the flow therein.

The removal of the pellets from the various zones of the fuel bed of the reactor to the storage vessels 134, 136 and 138 is accomplished in the same manner as the removal of the pellets from the annular area of the pressure 10 to storage vessel 130. All that is necessary is a flow of coolant upward through the pressure vessel 10 so that the pellets are separated into the various zones from which they can be removed as described above. The coolant flow will first cause the pellets to fluidize into a separated relation and then the pellets 24 having the greatest mass will gradually move to the lower zone with the pellets having the least mass moving to the upper zone as shown in FIG. 3. The pellets of intermediate mass will occupy the central zone. Once the pellets have been removed from the fuel bed, they can be cooled by the flow of coolant through the various storage vessels in the same manner that the pellets were cooled in the storage vessel 130. In order to replace the pellets removed from the various zones of the fuel bed, fresh pellets may be injected from the storage vessel 132 through the conduits 156 and 162 into the fuel bed through the open end 170 of conduit 162. It is not necessary to supply three separate points for injecting new pellets into the various zones of the fuel bed, since any pellets injected into the fuel bed will be automatically separated into the various zones of the fuel bed by the hydraulic action of the coolant flow upward through the fuel bed. Thus, pellets of different materials can be injected into the fuel bed and exposed to nuclear radiation and removed from the fuel bed without shutting down the reactor or opening the pressure vessel 10. Also, any pellet that is injected into the reactor will be exposed to direct nuclear radiation and will not have to be contained in particular testing ports as is presently done in known materials testing reactors.

This invention can be modified in various ways. For instance, the reactor shown in FIG. 2 can be used in the system illustrated in FIG. 3, and the central area of the reactor of FIG. 2 can be modified to have three zones as shown in FIG. 1. If the reactor of FIG. 2 were installed in the system of FIG. 3, the outlet 98 of manifold 96 would be connected to the conduit 124 of FIG. 3 to return the coolant flowing in tubular members 96 to the coolant system. Also, if it is only desired to breed fissionable material from fertile material and not test various materials, only one zone in the fuel bed would be necessary, since the fertile material could be placed in the annular area surrounding the fuel bed thus receiving neutron radiation from the fuel bed. Also, if it were only desired to test materials at one particular location in the fuel bed, only two zones would have to be provided, thus requiring only two conduits for removing the pellets from these two zones, and not the three conduits as illustrated in FIGS. 1 and 3.

Having described preferred embodiments of the invention in accordance with the patent statutes, it is desired that this invention be not limited to the specific constructions referred to herein for illustrative purposes, because it will be apparent, particularly to persons skilled in this art, that this invention may be embodied in a number of other illustrative forms.

We claim as our invention:

1. A reactor comprising, a core container having a perforated bottom wall, a bed of discrete, solid, freely movable pellets at least some of which contain fissionable material supported on said bottom wall, said pellets being of at least two different masses, a fluid outlet in the upper portion of said container, means preventing the escape of said pellets through said outlet, and means for supplying a flow of fluid capable of moderating fast neutrons upward through said bed of pellets in a variable amount and at a pressure sufficient to force said pellets upwardly in a separated relation to a variable degree to achieve a fluid to fuel ratio such as to sustain a chain reaction, said pellets of larger mass occupying substantially the lower portion of said pellet bed and said pellets of smaller mass occupying substantially the upper portion of said pellet bed.

2. A reactor comprising, a core container having a perforated bottom wall, a bed of discrete, solid, freely movable pellets at least some of which contain fissionable material supported on said bottom wall, said pellets being of at least two different densities and said pellets in addition all being of the same size, a fluid outlet in the upper portion of said container, means preventing the escape of said pellets through said outlet, and means for supplying a flow of fluid capable of moderating fast neutrons upward through said bed of pellets in a variable amount and at a pressure sufficient to force said pellets upwardly in a separated relation to a variable degree to achieve a fluid to fuel ratio such as to sustain a chain reaction, said pellets of greater density occupying substantially the lower portion of said pellet bed and said pellets of less density occupying substantially the upper portion of said pellet bed.

3. A reactor comprising, a core container having a perforated bottom wall, a bed of discrete solid, freely movable pellets at least some of which contain fissionable material supported on said bottom wall, said pellets being of at least two different masses, a fluid outlet in the upper portion of said container, means preventing the escape of said pellets through said outlet, and means for supplying a flow of fluid capable of moderating fast neutrons upward through said bed of pellets in an amount and at a pressure sufficient to force said pellets upwardly in a separated relation to a variable degree to achieve a fluid to fuel ratio such as to sustain a chain reaction, said pellets of larger mass occupying substantially the lower portion of said pellet bed and said pellets of smaller mass occupying substantially the upper portion of said pellet bed, and means to remove and replace said pellets from said upper and said lower portions of said pellet bed.

4. A reactor comprising, a core container having a perforated bottom wall, a bed of discrete, solid, freely movable pellets at least some of which contain fissionable material supported on said bottom wall, said pellet bed being enclosed by a tubular member radially spaced inwardly from said core container, the annular space between said member and said container filled with a bed of pellets of non-fissionable material, a flow directing means at the bottom of said core container for directing a flow of fluid upward through said pellet bed and said annular space, a fluid outlet in the upper portion of said core container, means preventing the escape of said pellets through said outlet, and means for supplying a coolant to said flow directing means in a variable amount and at a pressure sufficient to force at least said pellets containing fissionable material into a separated relation to form a predetermined critical pattern within said container.

5. A reactor comprising, a core container having a perforated bottom wall, a bed of discrete, solid, freely movable pellets at least some of which contain fissionable material supported on said bottom wall, said pellet bed being enclosed by a tubular member radially spaced inwardly from said core container, the annular space between said member and said container filled with a bed of pellets of a material capable of reflecting neutrons, a flow directing means at the bottom of said core container for directing a flow of fluid upward through said pellet bed and said annular space and a fluid outlet in the upper portion of said core container, means preventing the escape of said pellets through said outlet, and means for supplying a coolant to said flow directing means in a variable amount and at a pressure sufficient to force at least said pellets containing fissionable material into a separated relation to form a predetermined critical pattern within said container.

6. A reactor comprising, a core container having a perforated bottom wall adapted to support a first bed of solid freely movable pellets at least some of which contain fissionable material, said first pellet bed being enclosed by a tubular member radially spaced inwardly from said core container, the annular space between said member and said container filled with a second bed of pellets of non-fissionable material, a third bed of pellets of non-fissionable material having a greater individual mass than the pellets of said first bed and being enclosed by said tubular member, a fourth bed of solid pellets of non-fissionable material having a smaller individual mass than the pellets of said first bed and being enclosed by said tubular member, a fluid outlet in the upper portion of said container and means for supplying a fluid flow upward through said pellet beds in an amount and at a pressure sufficient to force at least the pellets of said first, third and fourth beds upwardly in separated relation to a variable degree to achieve a fluid to fuel ratio such as to sustain a chain reaction, said pellets of greatest individual mass occupying the lower zone of the pellet bed enclosed by said tubular member, said pellets of intermediate mass occupying the central zone of the pellet bed enclosed by said tubular member and said pellets of smallest mass occupying the upper zone of the pellet bed enclosed by said tubular member, and means including conduits for removing pellets from said lower, central and upper zones.

7. A reactor comprising, a core container having a perforated bottom wall adapted to support a bed of solid freely movable pellets at least some of which contain fissionable material, said pellet bed being enclosed by a tubular member radially spaced inwardly from said core container, the annular space between said member and said container filled with a bed of pellets of non-fissionable material, a flow directing means at the bottom of said core container for directing a flow of fluid upwardly through said pellet bed and said annular space, and a fluid outlet in the upper portion of said core container, and means for supplying a coolant capable of moderating fast neutrons to said flow directing means in an amount and at a pressure sufficient to force at least said pellets containing fissionable material into a separated relation such as to form a predetermined fluid to fuel ratio to sustain a chain reaction, and said flow directing means in addition diverting a portion of said coolant to flow through said non-fissionable pellets.

8. A reactor comprising, a core container having a perforated bottom wall adapted to support a bed of solid freely movable pellets at least some of which contain fissionable material, said pellet bed being enclosed by a tubular member radially spaced inwardly from said core container, the annular space between said member and said container filled with a bed of pellets of non-fissionable fertile material, a flow directing means at the bottom of said core container for directing a flow of fluid upwardly through said pellet bed and said annular space, and a fluid outlet in the upper portion of said core container, and means for supplying a coolant capable of moderating fast neutrons to said flow directing means in an amount and at a pressure sufficient to force at least said pellets containing fissionable material into a separated relation such as to form a predetermined fluid to fuel ratio to sustain a chain reaction.

9. A reactor comprising, a core container having a perforated bottom wall adapted to support a bed of solid freely movable pellets at least some of which contain fissionable material, said pellet bed being enclosed by a tubular member radially spaced inwardly from said core container, the annular space between said member and said container filled with a bed of pellets of non-fissionable material capable of being transformed into a different isotope of the same material under nuclear radiation, a flow directing means at the bottom of said core container for directing a flow of fluid upwardly through said pellet bed and said annular space, and a fluid outlet in the upper portion of said core container, and means for supplying a coolant to said flow directing means in an amount and at a pressure sufficient to force at least said pellets containing fissionable material into a separated relation such as to form a predetermined fluid to fuel ratio to sustain a chain reaction.

10. A reactor comprising, a core container having a perforated bottom wall adapted to support a first bed of solid freely movable pellets at least some of which contain fissionable material, said first pellet bed being enclosed by a tubular member radially spaced inwardly from said core container, the annular space between said member and said container filled with a bed of pellets of non-fissionable material, a second bed of solid pellets of non-fissionable material capable of reflecting neutrons being enclosed by said tubular member and having a greater individual mass than the pellets of said first bed, a third bed of solid pellets of non-fissionable material capable of reflecting neutrons being enclosed by said tubular member and having a smaller individual mass than the pellets of said first bed, a fluid outlet in the upper portion of said core container and means for supplying a fluid flow upward through said pellet beds in an amount and at a pressure sufficient to force said pellets upwardly in a separated relation to a variable degree to achieve a fluid to fuel ratio such as to sustain a chain reaction, said pellets of greatest individual mass occupying the lower zone of the pellet bed enclosed by said tubular member, said pellets of intermediate mass occupying the central zone of the pellet bed enclosed by said tubular member, and said pellets of smallest mass occupying the upper zone of the pellet bed enclosed by said tubular member, and means including conduits for removing pellets from said lower, central and upper zones.

11. A reactor comprising a core container, having a perforated bottom wall adapted to support a bed of freely movable pellets at least some of which contain fissionable material, a fluid outlet in the upper portion of said container, means for supplying a fluid flow capable of moderating fast neutrons upward through said bed of pellets in an amount and at a pressure sufficient to force said pellets upwardly in a separated relation to a variable degree to achieve a fluid to fuel ratio such as to sustain a chain reaction, means for varying the pellet to coolant flow in a portion of said pellet bed.

12. A reactor comprising a core container, having a perforated bottom wall adapted to support a first bed of freely movable pellets at least some of which contain fissionable material, said first pellet bed being enclosed by a tubular member radially spaced inwardly from said core container, a second bed of pellets of non-fissionable material filling the annular space between said tubular member and said container, a fluid outlet in the upper portion of said container, means for supplying a fluid flow capable of moderating fast neutrons upward through at least said first bed of pellets in an amount and at a pressure sufficient to force said pellets upwardly in a separated relation to a variable degree to achieve a fluid to fuel ratio such as to sustain a chain reaction, a plurality of substantially vertical tubular members passing through said first pellet bed and connected at the top to a common manifold, said vertical tubular members terminating in an open bottom end in the lower portion of said core container, an outlet passing through said container from said common manifold, means for controlling the upward flow in said tubular members so that said fluid to fuel ratio in said container may be varied.

13. A reactor comprising a core container, having a perforated bottom wall adapted to support a bed of freely movable pellets at least some of which contain fissionable material, a fluid outlet in the upper portion of said container, means for supplying a flow of fluid capable of moderating fast neutrons upward through said bed of pellets in an amount and at a pressure sufficient to force said pellets upwardly in a separated relation to a variable degree to achieve a fluid to fuel ratio such as to sustain a chain reaction, an inlet tube passing through said container and terminating in the upper portion of said pellet bed, the other end of said inlet tube connecting with a first storage container located outside said core container, said first storage container containing additional pellets of different material having a different mass than the pellets of the aforesaid bed, hydraulic means for transporting pellets from said first storage container through said inlet tube into said core container, an outlet tube passing through said core container and terminating in the lower portion of said pellet bed, the other end of said outlet tube connecting with a second storage container located outside said core container and hydraulic means for transporting said additional pellets from said core container through said outlet tube to said second storage container.

14. A reactor comprising a core container, having a perforated bottom wall adapted to support a bed of freely movable pellets at least some of which contain fissionable material, a fluid outlet in the upper portion of said container, means for supplying a flow of fluid capable of moderating fast neutrons upward through said bed of pellets in an amount and at a pressure sufficient to force said pellets upwardly in a separated relation to a variable degree to achieve a fluid to fuel ratio such as to sustain a chain reaction, an inlet tube passing through said container and terminating in the upper portion of said pellet bed, the other end of said inlet tube connecting with a first storage container located outside said core, said first storage container containing additional pellets of different material having a greater mass than the pellets of the aforesaid bed, said different material being capable of conversion into a still different material when subjected to bombardment by the products of nuclear fission, hydraulic means for transporting pellets from said first storage container through said inlet tube into said core container, an outlet tube passing through said core container and terminating in the lower portion of said pellet bed, the other end of said outlet tube connecting with a second storage container located outside said core container and hydraulic means for transporting said additional pellets from said core container through said outlet tube to said second storage container.

15. A reactor comprising a core container, having a perforated bottom wall adapted to support a bed of freely movable pellets at least some of which contain fissionable material, a fluid outlet in the upper portion of said container, means for supplying a flow of fluid capable of moderating fast neutrons upward through said bed of pellets in an amount and at a pressure sufficient to force said pellets upwardly in a separated relation to a variable degree to achieve a fluid to fuel ratio such as to sustain a chain reaction, an inlet tube passing through said container and terminating in the upper portion of said pellet bed, the other end of said inlet tube connecting with a first storage container located outside said core container, said first storage container containing additional pellets of different material than the pellets of the aforesaid bed, said different material being capable of conversion into a different isotope of the same material when subjected to bombardment by the products of nuclear fission, and the pellets of said different materials having a greater individual mass than the pellets of said bed, hydraulic means for transporting pellets from said first storage container through said inlet tube into said core container, an outlet tube passing through said core container and terminating in the lower portion of said pellet bed, the other end of said outlet tube connecting with a second storage container located outside said core container and hydraulic means for transporting said additional pellets from said core container through said outlet tube to said second storage container.

16. A reactor comprising a core container, having a perforated bottom wall adapted to support a bed of freely movable pellets at least some of which contain fissionable material, a fluid outlet in the upper portion of said container, means for supplying a flow of fluid capable of moderating fast neutrons upward through said bed of pellets in an amount and at a pressure sufficient to force said pellets upwardly in a separated relation to a variable degree to achieve a fluid to fuel ratio such as to sustain a chain reaction, an inlet tube passing through said core container and terminating in said pellet bed, the other end of said inlet tube connecting with a first storage container located outside said core container and containing additional pellets of different material and having a smaller individual mass than the pellets of said bed, hydraulic means for transporting said additional pellets from said first storage container through said inlet tube into said core container, an outlet tube passing through said core container and terminating in the upper portion of said fuel bed when said fuel bed is in said separated relation, the other end of said outlet tube connecting with a second storage container located outside said core container and hydraulic means for transporting said additional pellets from said core container through said outlet tube to said second storage container.

17. A reactor comprising a core container, having a perforated bottom wall adapted to support a bed of freely movable pellets at least some of which contain fissionable material, said bed of pellets consisting of pellets having at least two different masses, a fluid outlet in the upper portion of said container, means for supplying a fluid flow capable of moderating fast neutrons upward through said bed of pellets in an amount and at a pressure sufficient to force said pellets upwardly in a separated relation to a variable degree to achieve a fluid to fuel ratio such as to sustain a chain reaction, said fluid flow in addition separating the pellets of said pellet bed into a plurality of zones depending on the individual mass of said pellets, a pellet inlet tube passing through said core container and terminating in the upper portion of said pellet bed, the other end of said pellet inlet tube connecting with a first storage container located outside said core container and containing additional pellets, hydraulic means for transporting said additional pellets from said storage container into said core container, a plurality of outlet tubes passing through said core container and terminating in the plurality of zones into which said pellets have been separated, the other end of each of said outlet tubes connecting with one of a plurality of additional storage containers, and additional hydraulic means for transporting said pellets from said plurality of zones through said plurality of outlet tubes to said plurality of additional storage containers.

18. A reactor comprising a core container, having a perforated bottom wall, a bed of discrete freely movable pellets supported on said bottom wall, at least some of said pellets containing fissionable material, said pellet bed being enclosed by a tubular member radially spaced inwardly from said core container, the annular space between said member and said container being filled with a bed of pellets of non-fissionable material, an outlet conduit communicating with the upper portion of said tubular member and said annular space, means for preventing escape of said pellets through said conduit, means for supplying a coolant through said tubular member and through said annular space at a pressure sufficient to force said pellets into a separated relation to form a critical pattern within said container.

19. A reactor comprising a core container having a perforated bottom wall, a bed of discrete freely movable pellets supported on said bottom wall, said pellets being of at least two different masses and at least some of said pellets containing fissionable material, a fluid outlet in the upper portion of said container, said pellet bed being enclosed by a tubular member radially spaced inwardly from said core container, the annular space between said member and said container being filled with a bed of pellets of non-fissionable material, means for preventing escape of said pellets through said outlet, and means for supplying a flow of moderating fluid through said first-mentioned pellet bed in a variable amount and at a pressure sufficient to force at least those pellets of said first-mentioned bed upwardly in a separated relation to a variable degree to achieve a fluid-to-fuel ratio such as to sustain a chain reaction, said pellets of larger mass occupying the lower portion of said first-mentioned pellet bed and said pellets of smaller mass occupying substantially the upper portion of said first-mentioned pellet period.

References Cited in the file of this patent

UNITED STATES PATENTS 2,708,656    Fermi et al. _____ May 17, 1955
2,743,225    Ohlinger et al. _____ Apr. 24, 1956

OTHER REFERENCES

Morse: Industrial Engineering Chemistry, vol. 41, No. 6 (1949), pages 1117–1124.

Lauer et al.: Chemical Engineering Technique, Reinhold Pub. Corp. (1952), pages 303, 320.

Nuclear Engineering, part II. Chemical Engineering Progress Symposium Series. No. 12 (1954), vol. 50. American Institute of Chemical Engineers. (Copy in Library.) Pages 120–126.

Morris et al.: "Atomics," June, 1956, pp. 215–217, 223, 204/154 28F.